United States Patent
Weng

[11] Patent Number: 6,047,555
[45] Date of Patent: Apr. 11, 2000

[54] REFRIGERATING/AIR CONDITIONING HEAT EXCHANGING SYSTEM WITH COMBINED AIR/WATER COOLING FUNCTIONS AND THE METHOD FOR CONTROLLING SUCH A SYSTEM

[75] Inventor: Kuo-Liang Weng, Taichung, Taiwan

[73] Assignee: Yiue Feng Enterprise Co., Ltd., Taichung Hsien, Taiwan

[21] Appl. No.: 09/229,556

[22] Filed: Jan. 13, 1999

[51] Int. Cl.[7] .................................................. F28D 3/00
[52] U.S. Cl. .................................. 62/171; 62/183; 62/305
[58] Field of Search .............................. 62/171, 181, 183, 62/184, 305, DIG. 17

[56] References Cited

U.S. PATENT DOCUMENTS

| | | | |
|---|---|---|---|
| 4,170,117 | 10/1979 | Faxon | 62/183 |
| 4,240,265 | 12/1980 | Faxon | 62/171 |
| 4,266,406 | 5/1981 | Ellis | 62/183 |
| 4,438,635 | 3/1984 | McCoy, Jr. | 62/305 |
| 5,411,078 | 5/1995 | Ares | 165/113 |
| 5,444,991 | 8/1995 | Cox | 62/305 |
| 5,605,052 | 2/1997 | Middleton et al. | 62/171 |

*Primary Examiner*—Henry Bennett
*Assistant Examiner*—Marc Norman
*Attorney, Agent, or Firm*—Rosenberg, Klein & Lee

[57] ABSTRACT

A heat exchanging system includes a condenser including a heat exchanging chamber containing a heat exchanging medium therein and having an inlet end for entrance of the heat exchanging medium, and an outlet end for discharge of the heat exchanging medium; a control device; a water mist generating device having a spray pipe for spraying water into the heat exchanging chamber in a mist manner, a supply pipe for supplying water into the spray pipe, and a water valve for controlling the water supply of the supply pipe; a variable speed fan motor operated by the control device; and a sensing device having a first sensor mounted in the heat exchanging chamber, a second sensor mounted to the water mist generating device, and a third sensor mounted to the variable speed fan motor. In such a manner, the sensing device inputs the sensing values sensed by the first sensor, the second sensor, and the third sensor into the control device to be compared with the pre-determined values contained in the control device which can be used to control the operation of the water valve and the variable speed fan motor depending on the comparison results.

5 Claims, 10 Drawing Sheets

REFRIGERATING/AIR CONDITIONING HEAT EXCHANGING SYSTEM WITH COMBINED AIR/WATER COOLING FUNCTIONS AND THE METHOD FOR CONTROLLING SUCH A SYSTEM

BACKGROUND OF THE INVENTION

1. FIELD OF THE INVENTION

The present invention primarily relates to a refrigerating/air conditioning heat exchanging system with combined air/water cooling functions.

2. DESCRIPTION OF THE RELATED PRIOR ART

Figure 1:
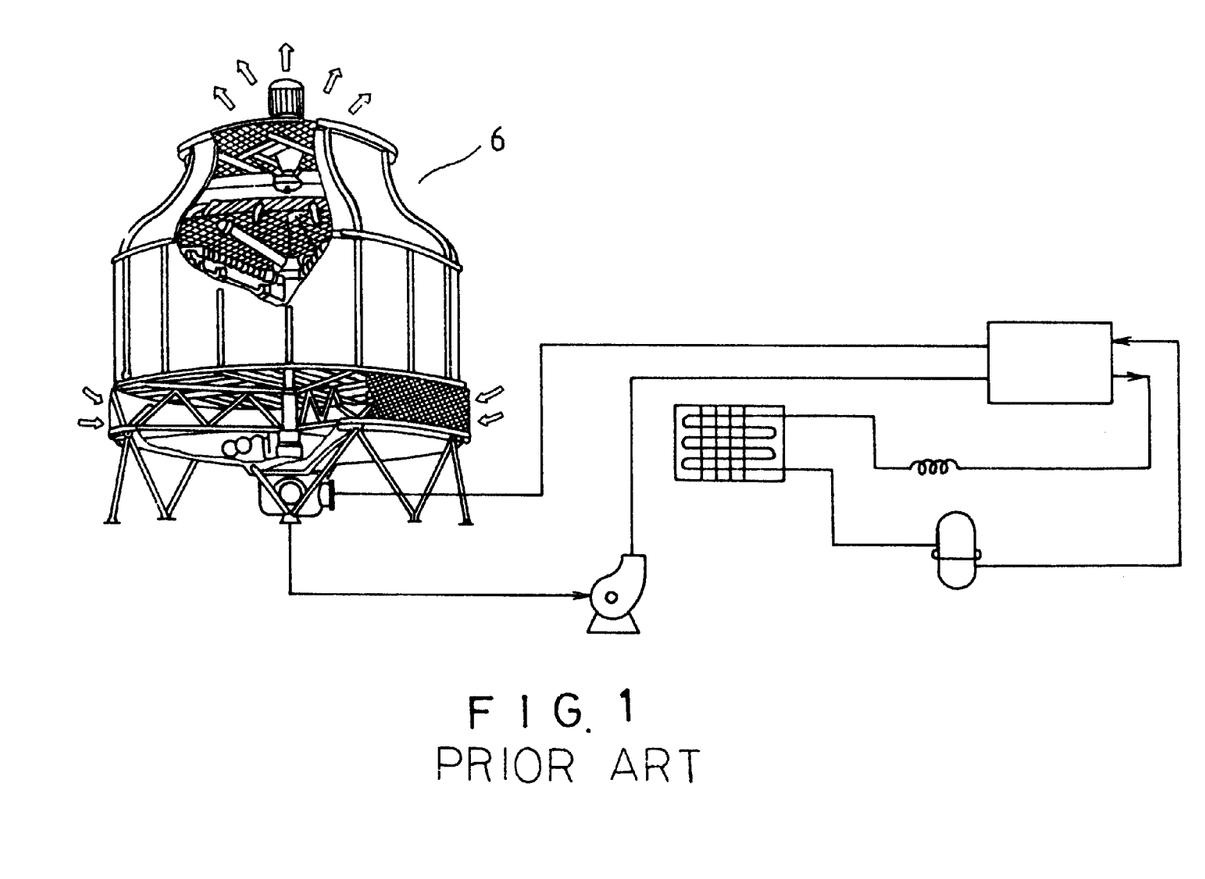
FIG. 1 is a perspective schematic view of a conventional water cooling type heat exchanging device according to the prior art.
Figure 2:
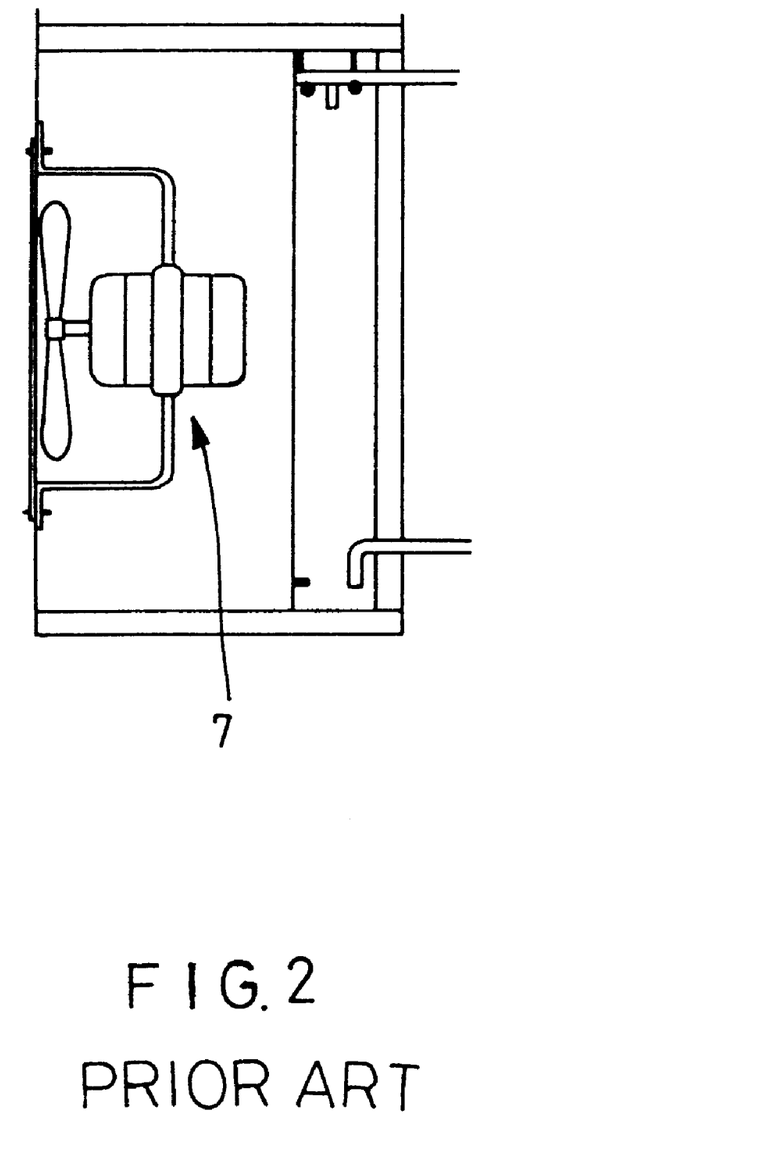
FIG. 2 is a schematic view of a conventional air cooling type heat exchanging device according to the prior art.

A conventional water cooling type heat exchanging device is shown in FIG. 1, and comprises a cooling tower. A conventional air cooling type heat exchanging device is shown in FIG. 2, and comprises a cooling fan motor. When the ambient environment is disposed in a dry and hot state with a higher temperature, it is better to use the water cooling type heat exchanging device, and when the ambient environment is disposed in a wet and cold state with a lower temperature it is better to use the air cooling type heat exchanging device such that the heat exchanging efficiency can be adapted to reach an optimal value. Accordingly, the present invention has arisen to provide a heat exchanging system with combined air/water cooling functions.

SUMMARY OF THE INVENTION

The primary objective of the present invention is to provide a heat exchanging system which can be used to reduce the heat pollution effect thereof to the ambient environment to a minimum value.

Another objective of the present invention is to provide a heat exchanging system which has combined air/water cooling functions, thereby obtaining an optimal heat exchanging efficiency.

A further objective of the present invention is to provide a heat exchanging system which can be adapted to prevent water consumption, and save energy.

According to the present invention, there is provided a heat exchanging system comprising a condenser, and a heat exchanging medium flowing through the condenser, the condenser comprising: an air cooling type heat exchanging chamber containing the heat exchanging medium therein, and including an inlet end for entrance of the heat exchanging medium, and an outlet end for discharge of the heat exchanging medium, a water collecting pan mounted on the bottom of the heat exchanging chamber; a control device; a water mist generating device including a spray pipe mounted on the heat exchanging chamber and provided with a plurality of pores for spraying water into the heat exchanging chamber in a mist manner, a supply pipe connected to the spray pipe for supplying water into the spray pipe, and a water valve mounted on the supply pipe and operated by the control device for controlling the water supply of the supply pipe; a variable speed fan motor mounted in front of the heat exchanging chamber and connected to the control device which controls the operation of the variable speed of the variable speed fan motor; and a sensing device connected to the control device and including a first sensor mounted in the heat exchanging chamber, a second sensor mounted to the water mist generating device, and a third sensor mounted to the variable speed fan motor.

In such a manner, the sensing device inputs the sensing values sensed by the first sensor, the second sensor, and the third sensor into the control device to be compared with the pre-determined values contained in the control device which can be used to control the operation of the water valve and the variable speed fan motor depending on the comparison results.

Still according to the present invention, there is provided a method for controlling the heat exchanging system, wherein, assuming: TAC is the condensing temperature in the heat exchanging chamber sensed by the first sensor, TSC is the condensing temperature pre-set in the control device, X is a pre-set difference value, and $\Delta TC$ is equal to TAC−TSC, then the control method comprising the steps of:

(A) when $TAC \geq TSC+X$, the water valve of the water mist generating device is opened, the opening time of the water valve is to a maximum value and the variable speed fan motor is operated at a full rotational speed;

(B) when $TSC < TAC < TSC+X$, the water valve of the water mist generating device is opened, $\Delta TC$ is taken as the time parameter of the opening time of the water valve, and the rotational speed of the variable speed fan motor is proportional to TAC; and (C) when $TAC \leq TSC$, the water valve of the water mist generating device is closed, and the variable speed fan motor is operated at a lowest rotational speed.

Further objectives and advantages of the present invention will become apparent after a careful reading of the detailed description with reference to the accompanying drawings.

DETAILED DESCRIPTION OF THE PREFERRED EMBODIMENTS

Figure 3:
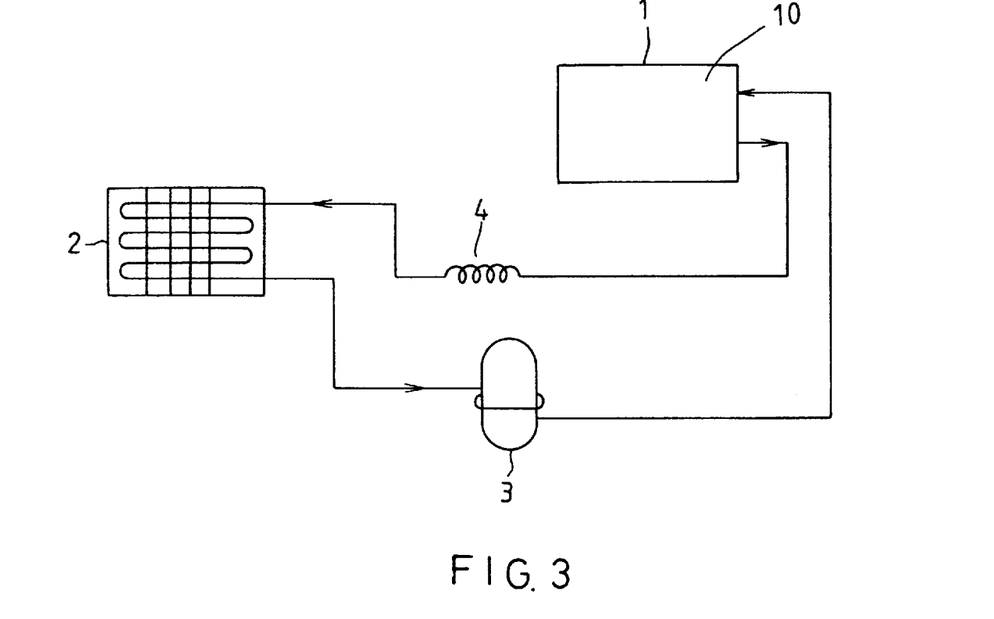
FIG. 3 is a schematic view of a refrigerating/air conditioning heat exchanging system according to the present invention.
Figure 4:
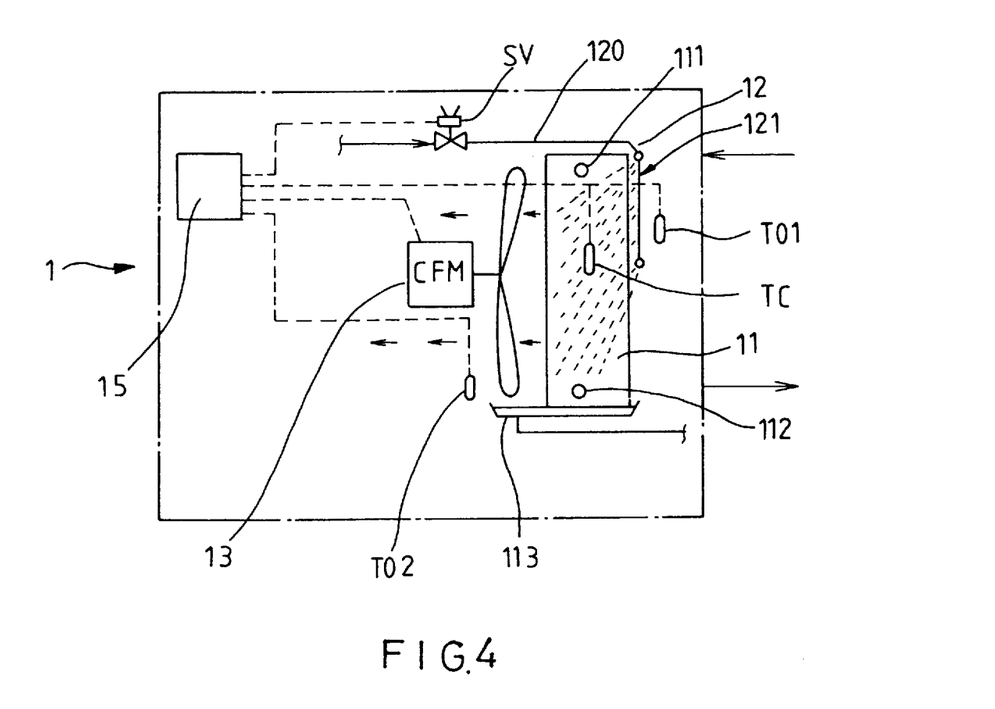
FIG. 4 is a schematic view of a condenser of the heat exchanging system as shown in FIG. 3.
Figure 5:
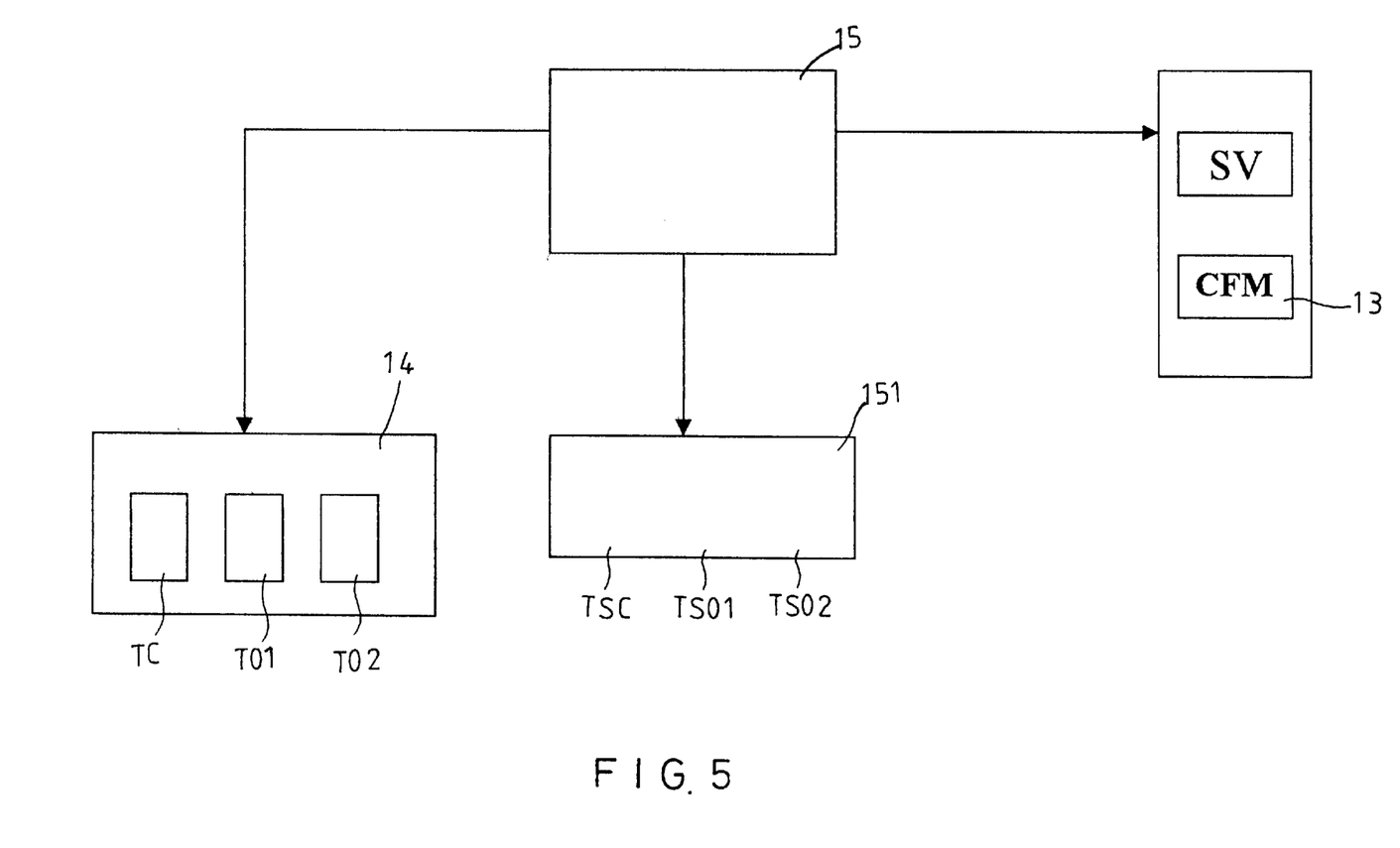
FIG. 5 is a block view of the heat exchanging system as shown in FIG. 4.

With reference to FIGS. 3–5, a refrigerating/air conditioning heat exchanging system with combined air/water cooling functions according to the present invention comprises a compressor 3, a condenser 1, a heat exchanging medium 10 such as a circulating refrigerant flowing through the condenser 1, a refrigerant flow amount controller 4, and an evaporator 2.

The condenser 1 comprises: an air cooling type heat exchanging chamber 11 containing the circulating refrigerant of the heat exchanging medium 10, and including an inlet end 111 for entrance of the circulating refrigerant of the heat exchanging medium 10, and an outlet end 112 for discharge of the circulating refrigerant of the heat exchanging medium 10, a water collecting pan 113 mounted on the bottom of the heat exchanging chamber 11; a control device 15; a water mist generating device 12 (or a water cooling type heat radiating device) including a spray pipe 121 mounted on the heat exchanging chamber 11 and provided with a plurality of pores for spraying water into the heat exchanging chamber 11 in a mist manner, a supply pipe 120 connected to the spray pipe 121 for supplying water into the spray pipe 121, and a water valve SV mounted on the supply pipe 120 and operated by the control device 15 for controlling the water supply of the supply pipe 120; a variable speed fan motor 13 (CFM) mounted in front of the heat exchanging chamber 11 and connected to the control device 15 which controls operation of the variable speed of the variable speed fan motor 13 (CFM); and a sensing device 14 connected to the control device 15 and including a first sensor TC mounted in the heat exchanging chamber 11, a second sensor T01 mounted to the water mist generating device 12 located adjacent to the inlet end 111, and a third sensor T02 mounted to the variable speed fan motor 13 (CFM) located adjacent to the outlet end 112.

In such a manner, with reference to FIG. 5, the sensing device 14 inputs the sensing values TAC, TA01, and TA02 respectively sensed by the first sensor TC, the second sensor T01, and the third sensor T02 into the control device 15 to be compared with the pre-determined values TSC, TS01, and TS02 contained in the setting unit 151 of the control device 15 which can be used to control the operation of the water valve SV and the variable speed fan motor 13 (CFM) depending upon the comparison results.

Figure 6:
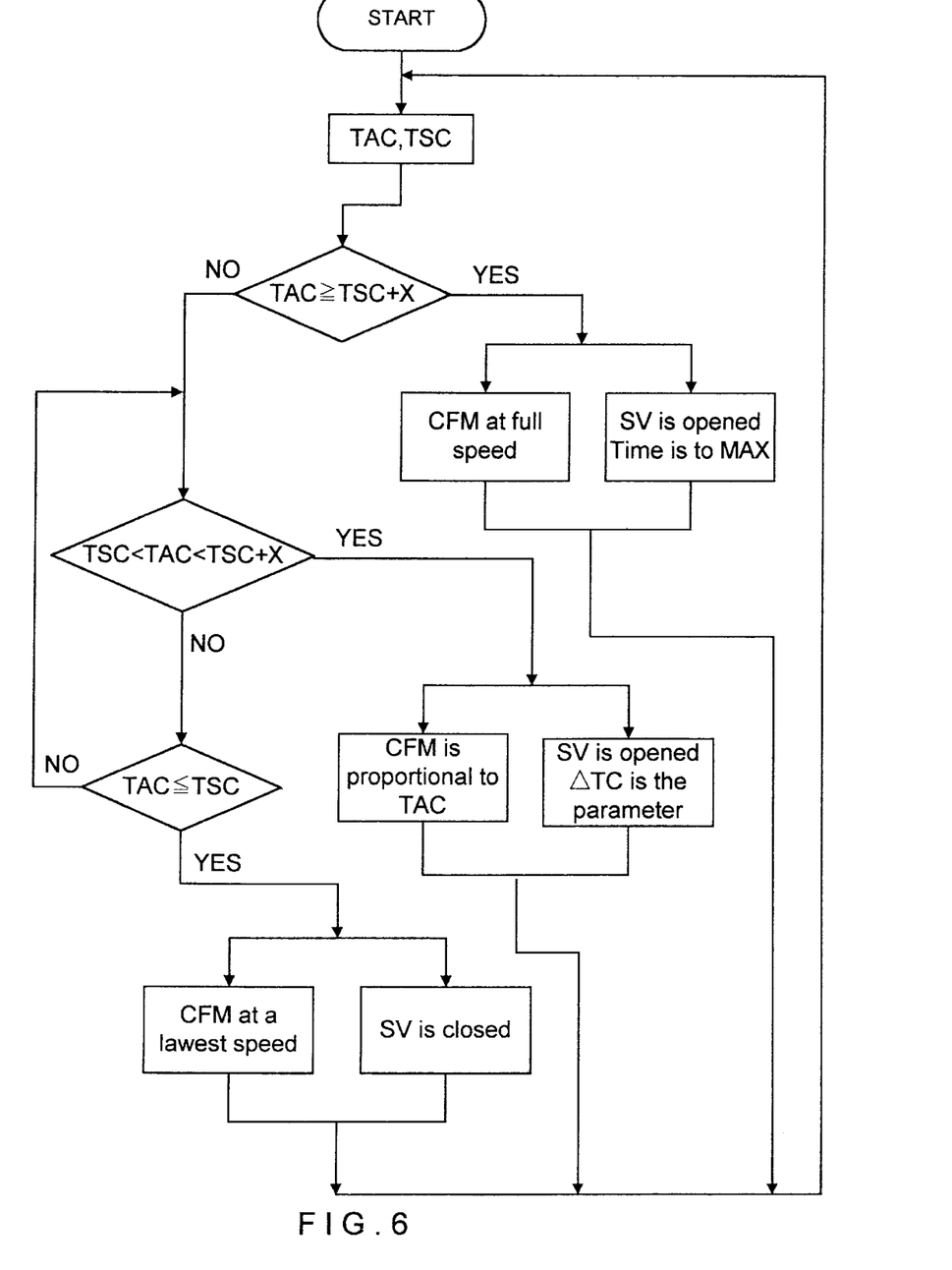
FIG. 6 is a flow chart of a first method for controlling the heat exchanging system as shown in FIG. 4.

With reference to FIG. 6, a first method is provided for controlling the heat exchanging system according to the present invention, by assuming: TAC is the condensing temperature in the heat exchanging chamber 11 sensed by the first sensor TC, TSC is the condensing temperature pre-set in the control device 15, X is a pre-set difference value, and $\Delta TC$ is equal to TAC–TSC. The sensing device 14 inputs the sensing value TAC sensed by the first sensor TC into the control device 15 to be compared with the pre-determined value TSC contained in the setting unit 151 of the control device 15, thereby controlling the operation of the water valve SV and the variable speed fan motor 13 (CFM) depending upon the comparison results as follows.

The first control method comprises the following steps:

(A) when TAC$\geq$TSC+X, it indicates that there is a great heat radiating demand, the water valve SV of the water mist generating device 12 is opened, then the spray pipe 121 begins to spray water to the heat exchanging chamber 11 in a mist manner, the opening time of the water valve SV is to a maximum value (MAX), and the variable speed fan motor 13 (CFM) is operated at a full rotational speed. In such a manner, the condensing temperature TAC in the heat exchanging chamber 11 can be reduced rapidly such that the temperature of air flowing through the heat exchanging chamber 11 is not too high. At this stage, the heat contained in the heat exchanging chamber 11 is radiated by means of combined air/water cooling actions.

(B) when TSC<TAC<TSC+X, the water valve SV of the water mist generating device 12 is opened, $\Delta TC$ is taken as the time parameter of the opening time of the water valve SV, thereby preventing water consumption, and the rotational speed of the variable speed fan motor 13 (CFM) is proportional to the value of TAC. In such a manner, the condensing temperature TAC in the heat exchanging chamber 11 can be adapted to approach the ideal condensing temperature TSO. At this stage, the heat contained in the heat exchanging chamber 11 is radiated by means of combined air/water cooling actions.

(C) when TAC$\leq$TSC, it indicates that the heat exchanging capacity is greater than the heat required to be dissipated by the heat exchanging system, then the water valve SV of the water mist generating device 12 is closed, and the variable speed fan motor 13 (CFM) is operated at a lowest rotational speed. At this stage, the heat contained in the heat exchanging chamber 11 is radiated by means of the air cooling action only.

Figure 7:
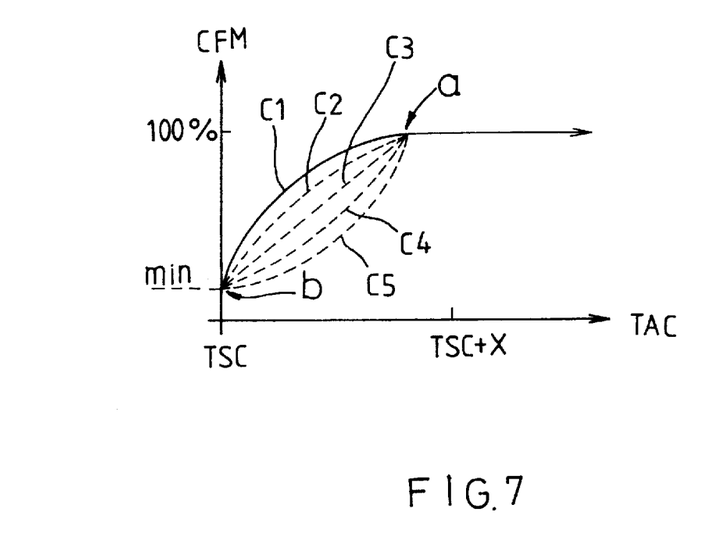
FIG. 7 is a graph of the rotational speed of a variable speed motor fan versus the condensing temperature of a heat exchanging system.

With reference to FIG. 7, FIG. 7 is a graph of the rotational speed of the variable speed motor fan 13 (CFM) versus the condensing temperature TAC. When TAC$\leq$TSC, the variable speed fan motor 13 (CFM) is operated at its minimum rotational speed as indicated by point b. When TSC<TAC<TSC+X, the rotational speed of the variable speed fan motor 13 (CFM) is proportional to the value of TAC as shown in curves $C_1$, $C_2$, $C_3$, $C_4$ and $C_5$ between point b and point a. When TAC$\geq$TSC+X, the variable speed fan motor 13 (CFM) is operated at its maximum rotational speed (100%) as indicated by point a.

Figure 8:
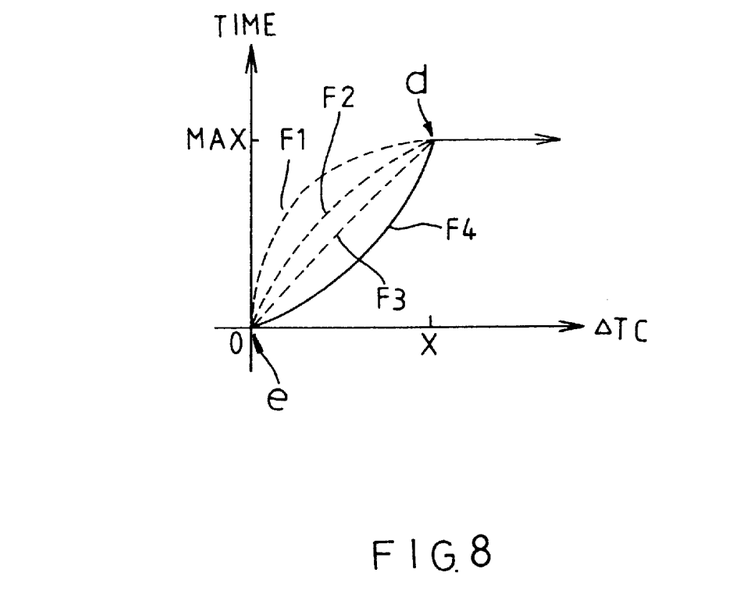
FIG. 8 is a graph of the opening time of a water valve SV versus the temperature difference $\Delta TC$.

With reference to FIG. 8, FIG. 8 is a graph of the opening time of the water valve SV versus the temperature difference $\Delta TC$ ($\Delta TC$=TAC–TSC). When TAC$\leq$TSC, the water valve SV of the water mist generating device 12 is closed as indicated by point e. When TSC<TAC<TSC+X, the opening time of the water valve SV is proportional to the value of $\Delta TC$ as shown in curves $F_1$, $F_2$, $F_3$, and $F_4$ between point e and point d. When TAC$\geq$TSC+X, the opening time of the water valve SV is to a maximum value (MAX) as indicated by point d.

Figure 9:
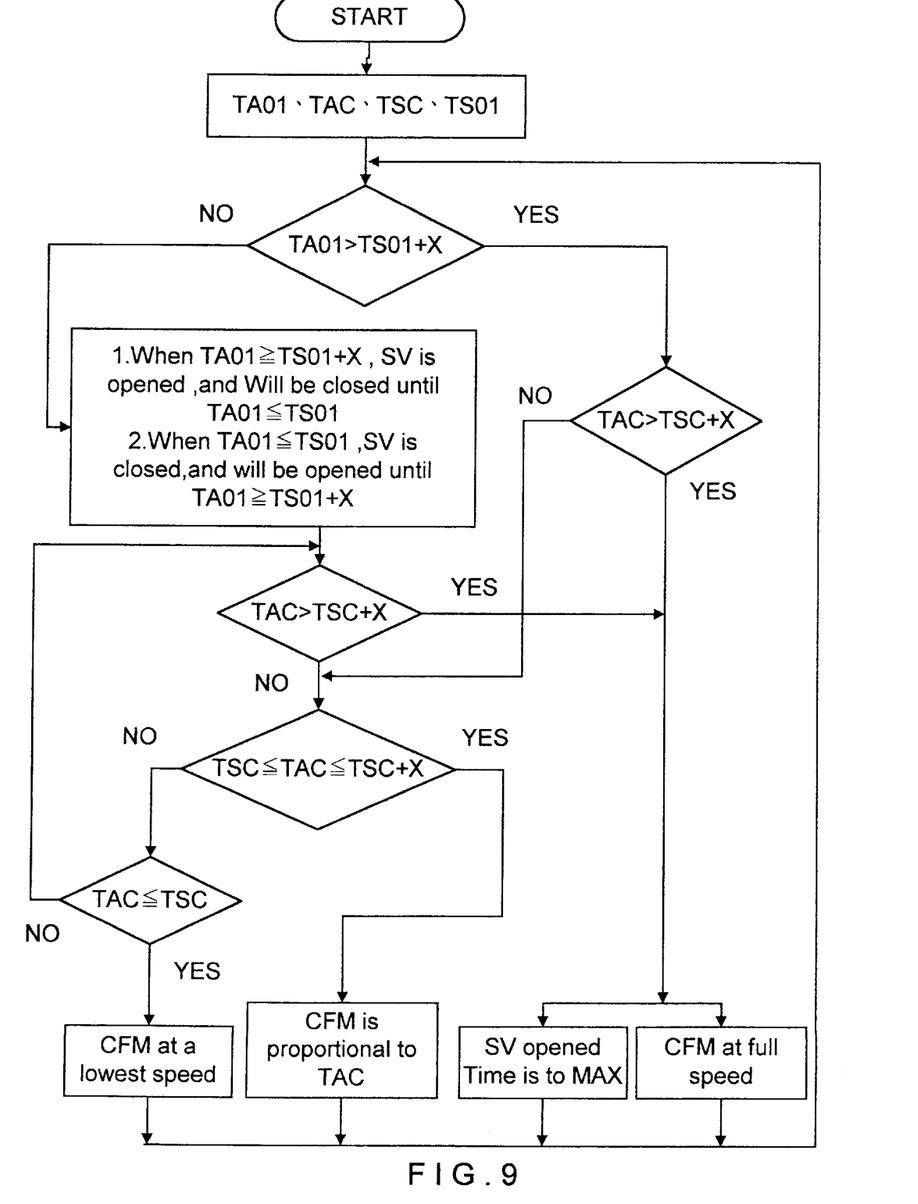
FIG. 9 is a flow chart of a second method for controlling the heat exchanging system as shown in FIG. 4.

With reference to FIG. 9, a second method is provided for controlling the heat exchanging system according to the present invention, by assuming: TA01 is the temperature at the inlet end 111 of the heat exchanging chamber 11 sensed by the second sensor T01, and TS01 is the temperature at the inlet end 111 of the heat exchanging chamber 11 pre-set in the control device 15. The sensing device 14 inputs the sensing value TA01 sensed by the second sensor T01 into the control device 15 to be compared with the pre-determined value TS01 contained in the setting unit 151 of the control device 15, thereby controlling the operation of the water valve SV and the variable speed fan motor 13 (CFM) depending upon the comparison results as follows.

The second control method comprises the following steps:

(A) when TA01>TS01+X, and TAC>TSC+X, the water valve SV of the water mist generating device 12 is opened, the opening time of the water valve SV is to a maximum value (MAX), and the variable speed fan motor 13 (CFM) is operated at a full rotational speed. In such a manner, the temperature in the heat exchanging chamber 11 can be reduced rapidly such that the temperature of air flowing through the heat exchanging chamber 11 is not too high. At this stage, the heat contained in the heat exchanging chamber 11 is radiated by means of combined air/water cooling actions.

(B) when TA01$\leq$TS01+X:

(I) the water valve SV of the water mist generating device 12 is operated according to the following conditions:

(a) when $TA01 \geq TS01+X$, the water valve SV is opened, then the water valve SV is closed until $TA01 \geq TS01$.

(b) when $TA01 \leq TS01$, the water valve SV is closed, then the water valve SV is opened until $TA01 \geq TS01+X$.

(II) the variable speed fan motor 13 (CFM) is operated according to the following conditions:

(a) when $TAC>TSC+X$, the variable speed fan motor 13 (CFM) is operated at a full rotational speed. At this stage, the heat contained in the heat exchanging chamber 11 is radiated by means of combined air/water cooling actions.

(b) when $TSC \leq TAC \leq TSC+X$, the rotational speed of the variable speed fan motor 13 (CFM) is proportional to TAC. At this stage, the heat contained in the heat exchanging chamber 11 is radiated by means of combined air/water cooling actions.

(c) when $TAC \leq TSC$, the variable speed fan motor 13 (CFM) is operated at a lowest rotational speed. At this stage, the heat contained in the heat exchanging chamber 11 is radiated by means of the air cooling actions only.

Figure 10:
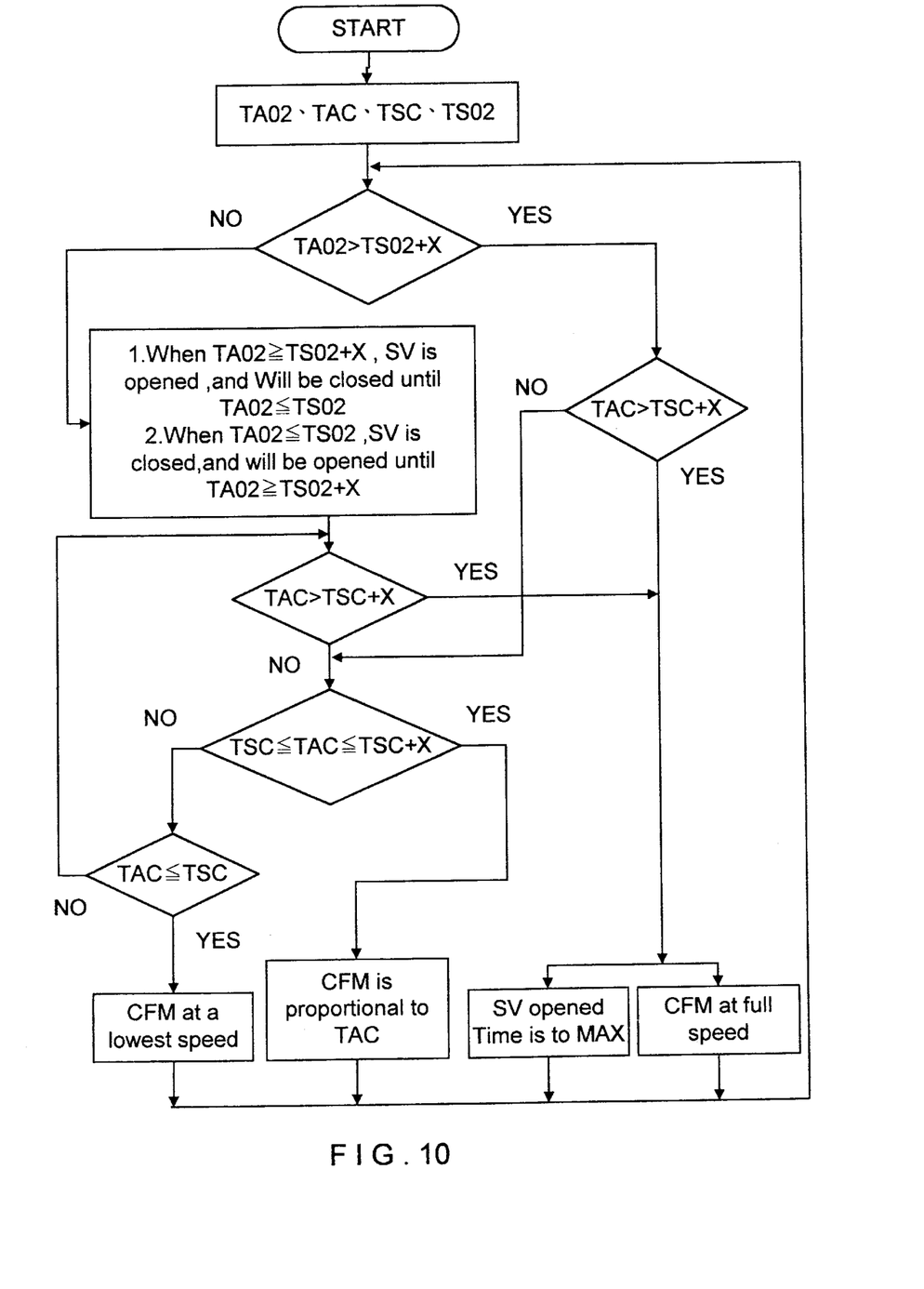
FIG. 10 is a flow chart of a third method for controlling the heat exchanging system as shown in FIG. 4.

With reference to FIG. 10, a third method is provided for controlling the heat exchanging system according to the present invention, by assuming: TA02 is the temperature at the outlet end 112 of the heat exchanging chamber 11 sensed by the third sensor T02, and TS02 is the temperature at the outlet end 112 of the heat exchanging chamber 11 pre-set in the control device 15. The sensing device 14 inputs the sensing value TA02 sensed by the third sensor T02 into the control device 15 to be compared with the pre-determined value TS02 contained in the setting unit 151 of the control device 15, thereby controlling the operation of the water valve SV and the variable speed fan motor 13 (CFM) depending upon the comparison results as follows.

The third control method comprises the following steps:

(A) when $TA02>TS02+X$, and $TAC>TSC+X$, the water valve SV of the water mist generating device 12 is opened, the opening time of the water valve SV is to a maximum value (MAX), and the variable speed fan motor 13 (CFM) is operated at a full rotational speed. In such a manner, the temperature in the heat exchanging chamber 11 can be reduced rapidly such that the temperature of air flowing through the heat exchanging chamber 11 is not too high. At this stage, the heat contained in the heat exchanging chamber 11 is radiated by means of combined air/water cooling actions.

(B) when $TA02 \leq TS02+X$:

(I) the water valve SV of the water mist generating device 12 is operated according to the following conditions:

(a) when $TA02 \geq TS02+X$, the water valve SV is opened, then the water valve SV is closed until $TA02 \leq TS02$.

(b) when $TA02 \leq TS02$, the water valve SV is closed, then the water valve SV is opened until $TA02 \geq TS02+X$.

(II) the variable speed fan motor 13 (CFM) is operated according to the following conditions:

(a) when $TAC>TSC+X$, the variable speed fan motor 13 (CFM) is operated at a full rotational speed. At this stage, the heat contained in the heat exchanging chamber 11 is radiated by means of combined air/water cooling actions.

(b) when $TSC \leq TAC \leq TSC+X$, the rotational speed of the variable speed fan motor 13 (CFM) is proportional to TAC. At this stage, the heat contained in the heat exchanging chamber 11 is radiated by means of combined air/water cooling actions.

(c) when $TAC \leq TSC$, the variable speed fan motor 13 (CFM) is operated at a lowest rotational speed. At this stage, the heat contained in the heat exchanging chamber 11 is radiated by means of the air cooling actions only.

Figure 11:
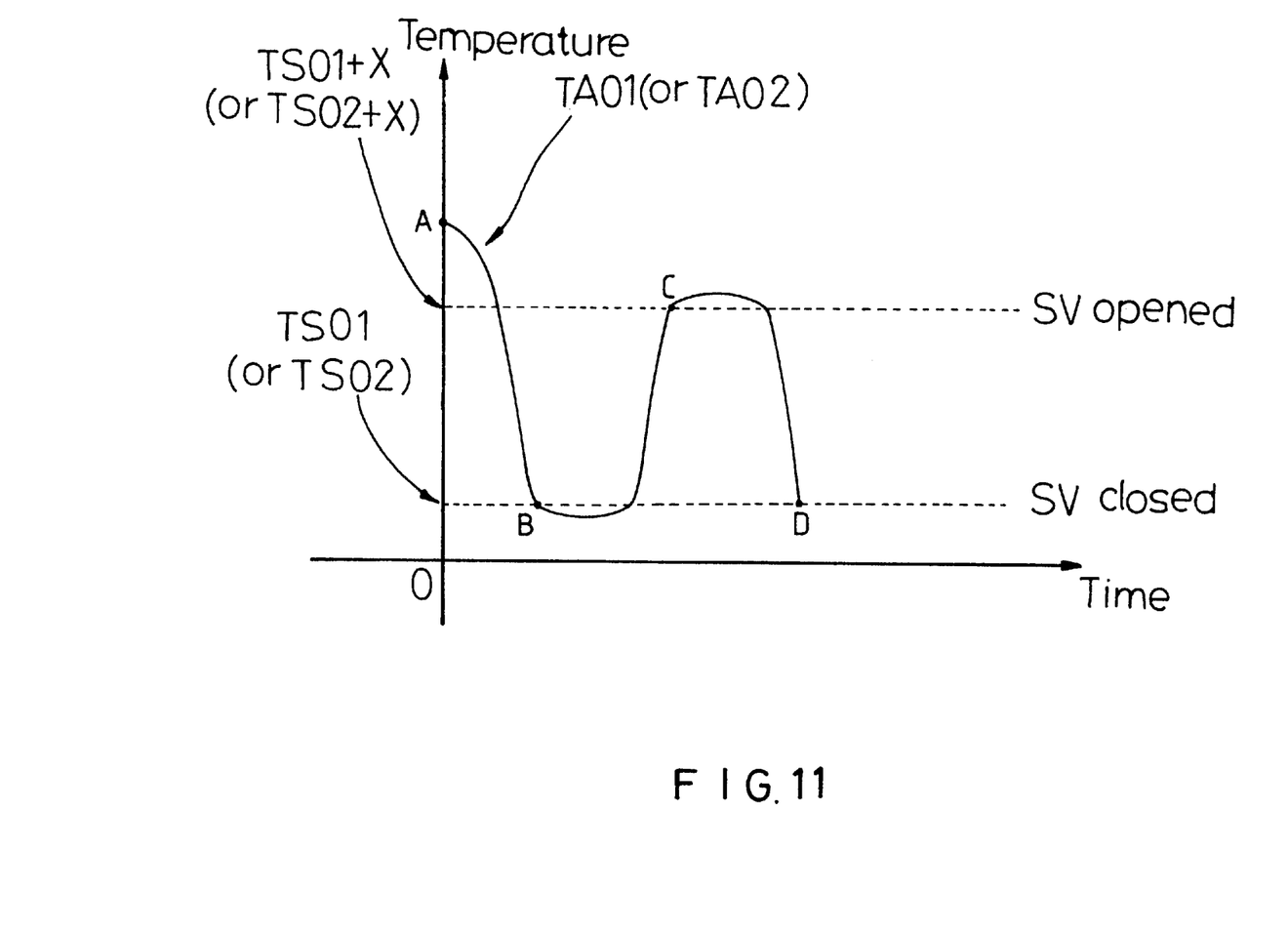
FIG. 11 is a graph of the temperature versus the opening time of the water valve.

With reference to FIG. 11, FIG. 11 is a graph of the temperature versus the opening time of the water valve SV When TA01 (or TA02) is decreased from point A to point B where TA01=TS01 (or TA02=TS02), the water valve SV is closed. When TA01 (or TA02) is increased from point B to point C where TA01=TS01+X (or TA02=TS02+X), the water valve SV is opened. When TA01 (or TA02) is again decreased from point C to point D where TA01=TS01 (or TA02=TS02), the water valve SV is again closed.

Figure 12:
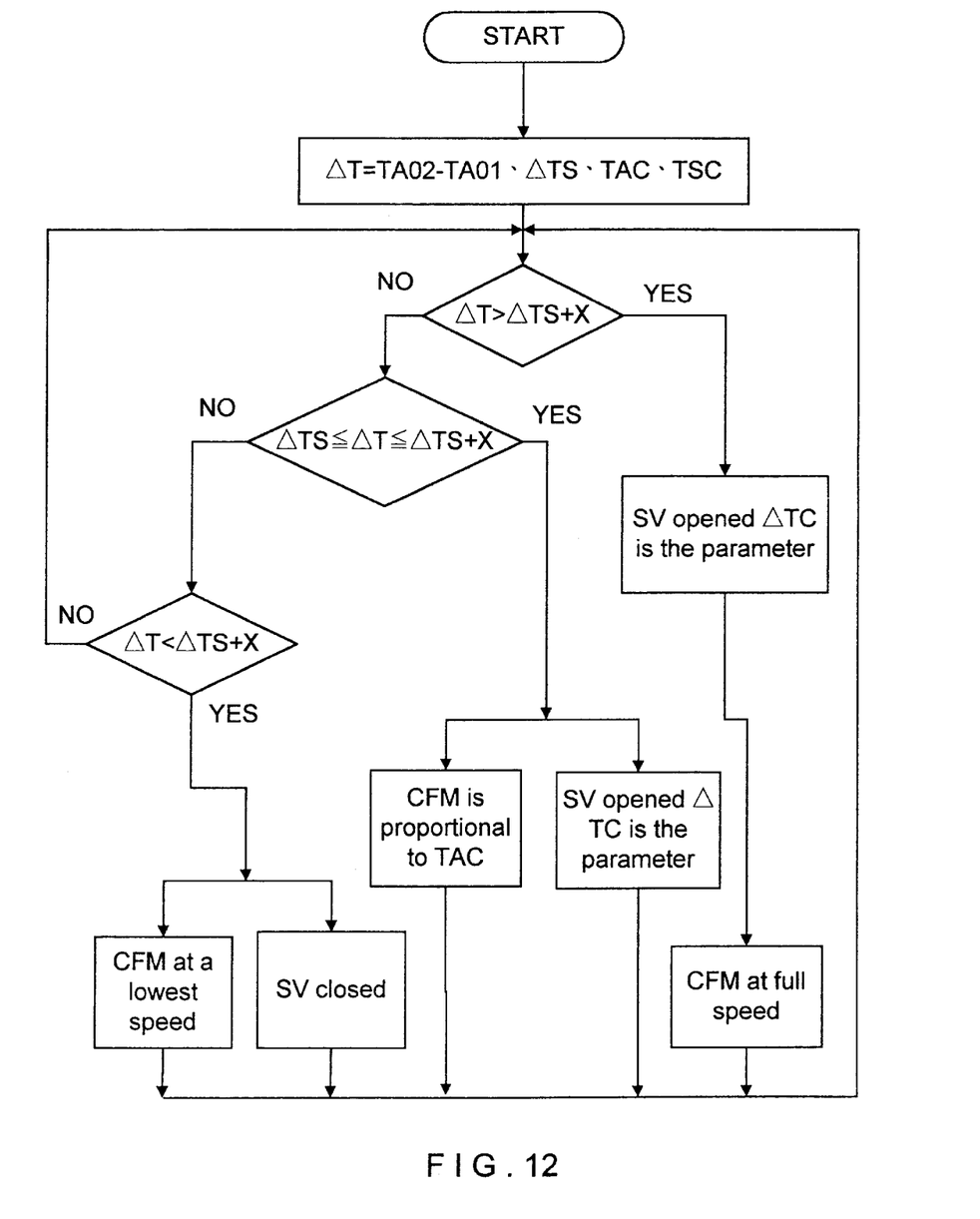
FIG. 12 is a flow chart of a fourth method for controlling the heat exchanging system as shown in FIG. 4.

With reference to FIG. 12, a fourth method is provided for controlling the heat exchanging system according to the present invention, by assuming: ΔT is equal to the difference value of TA02−TA01, ΔTS is the difference value of TA02−TA01 pre-set in the setting unit 151 of the control device 15.

The fourth control method comprises the following steps:

(A) when $\Delta T>\Delta TS+X$, the water valve SV of the water mist generating device 12 is opened. $\Delta TC(\Delta TC=TAC-TSC)$ is taken as the time parameter of the opening time of the water valve SV, and the variable speed fan motor 13 (CFM) is operated at a full rotational speed. At this stage, the heat contained in the heat exchanging chamber 11 is radiated by means of combined air/water cooling actions.

(B) when $\Delta TS \leq \Delta T \leq \Delta TS+X$, the water valve SV of the water mist generating device 12 is opened, ΔTC is taken as the time parameter of the opening time of the water valve SV, and the rotational speed of the variable speed fan motor 13 (CFM) is proportional to TAC. At this stage, the heat contained in the heat exchanging chamber 11 is radiated by means of combined air/water cooling actions.

(C) when $\Delta T<\Delta TS+X$, the water valve SV of the water mist generating device 12 is closed, and the variable speed fan motor 13 (CFM) is operated at a lowest rotational speed. At this stage, the heat contained in the heat exchanging chamber 11 is radiated by means of the air cooling actions only.

Although the present invention has been described with a certain degree of particularity, it is to be understood that the present disclose has been made by way of example only and that many other possible modifications and variations can be made without departing from the scope and spirit of the present invention.

I claim:

1. A refrigerating/air conditioning heat exchanging system comprising a condenser, and a heat exchanging medium flowing through the condenser, and the condenser comprising:

an air cooling type heat exchanging chamber containing the heat exchanging medium therein, and including an inlet end for entrance of the heat exchanging medium, and an outlet end for discharge of the heat exchanging medium, a water collecting pan mounted on the bottom of the heat exchanging chamber;

a control device;

a water mist generating device including a spray pipe mounted on the heat exchanging chamber and provided with a plurality of pores for spraying water into the heat exchanging chamber in a mist manner, a supply pipe connected to the spray pipe for supplying water into the spray pipe, and a water valve mounted on the supply pipe and operated by the control device for controlling the water supply of the supply pipe;

a variable speed fan motor mounted in front of the heat exchanging chamber and connected to the control device which controls operation of the variable speed of the variable speed fan motor; and a sensing device connected to the control device and including a first sensor mounted in the heat exchanging chamber, a second sensor mounted to the water mist generating device, and a third sensor mounted to the variable speed fan motor;

wherein, the sensing device inputs the sensing values sensed by the first sensor, the second sensor, and the third sensor into the control device to be compared with the pre-determined values contained in the control device which can be used to control the operation of the water valve and the variable speed fan motor depending on the comparison results.

2. A method for controlling the heat exchanging system as claimed in claim 1, wherein, assuming: TAC is the condensing temperature in the heat exchanging chamber sensed by the first sensor, TSC is the condensing temperature pre-set in the control device, X is a pre-set difference value, and $\Delta TC$ is equal to TAC−TSC, then the control method comprising the steps of:

(A) when $TAC \geq TSC+X$, the water valve of the water mist generating device is opened, the opening time of the water valve is to a maximum value, and the variable speed fan motor is operated at a full rotational speed;

(B) when $TSC<TAC<TSC+X$, the water valve of the water mist generating device is opened, $\Delta TC$ is taken as the time parameter of the opening time of the water valve, and the rotational speed of the variable speed fan motor is proportional to TAC; and (C) when $TAC \leq TSC$, the water valve of the water mist generating device is closed, and the variable speed fan motor is operated at a lowest rotational speed.

3. A method for controlling the heat exchanging system as claimed in claim 2, wherein, assuming: TA01 is the temperature at the inlet end of the heat exchanging chamber sensed by the second sensor, TS01 is the temperature at the inlet end of the heat exchanging chamber pre-set in the control device, then the control method comprising the steps of:

(A) when $TA01>TS01+X$, and $TAC>TSC+X$, the water valve of the water mist generating device is opened, the opening time of the water valve is to a maximum value, and the variable speed fan motor is operated at a full rotational speed;

(B) when $TA01 \leq TS01+X$:

(I) the water valve of the water mist generating device is operated according to the following conditions:
(a) when $TA01 \geq TS01+X$, the water valve is opened, then the water valve is closed until $TA01 \leq TS01$;
(b) when $TA01 \leq TS01$, the water valve is closed, then the water valve is opened until $TA01 \geq TS01+X$;

(II) the variable speed fan motor is operated according to the following conditions:

(a) when $TAC>TSC+X$, the variable speed fan motor is operated at a full rotational speed;
(b) when $TSC \leq TAC \leq TSC+X$, the rotational speed of the variable speed fan motor is proportional to TAC;
(c) when $TAC \leq TSC$, the variable speed fan motor is operated at a lowest rotational speed.

4. A method for controlling the heat exchanging system as claimed in claim 3, wherein, assuming: TA02 is the temperature at the outlet end of the heat exchanging chamber sensed by the third sensor, TS02 is the temperature at the outlet end of the heat exchanging chamber pre-set in the control device, then the control method comprising the steps of:

(A) when $TA02>TS02+X$, and $TAC>TSC+X$, the water valve of the water mist generating device is opened, the opening time of the water valve is to a maximum value, and the variable speed fan motor is operated at a full rotational speed;

(B) when $TA02 \leq TS02+X$:

(I) the water valve of the water mist generating device is operated according to the following conditions:
(a) when $TA02 \geq TS02+X$, the water valve is opened then the water valve is closed until $TA02 \leq TS02$;
(b) when $TA02 \leq TS02$, the water valve is closed, then the water valve is opened until $TA02 \geq TS02+X$;

(II) the variable speed fan motor is operated according to the following conditions:
(a) when $TAC>TSC+X$, the variable speed fan motor is operated at a full rotational speed;
(b) when $TSC \leq TAC \leq TSC+X$, the rotational speed of the variable speed fan motor is proportional to TAC;
(c) when $TAC \leq TSC$, the variable speed fan motor is operated at a lowest rotational speed.

5. A method for controlling the heat exchanging system as claimed in claim 4, wherein, assuming: $\Delta T$ is equal to the difference value of TA02−TA01, $\Delta TS$ is the difference value of TA02−TA01 pre-set in the control device, then the control method comprising the steps of:

(A) when $\Delta T>\Delta TS+X$, the water valve of the water mist generating device is opened, $\Delta TC$ is taken as the time parameter of the opening time of the water valve, and the variable speed fan motor is operated at a full rotational speed;

(B) when $\Delta TS \leq \Delta T \leq \Delta TS+X$, the water valve of the water mist generating device is opened, $\Delta TC$ is taken as the time parameter of the opening time of the water valve, and the rotational speed of the variable speed fan motor is proportional to TAC; and (C) when $\Delta T<\Delta TS+X$, the water valve of the water mist generating device is closed, and the variable speed fan motor is operated at a lowest rotational speed.

* * * * *